United States Patent [19]

Kondo

[11] Patent Number: 5,120,966
[45] Date of Patent: * Jun. 9, 1992

[54] METHOD OF AND APPARATUS FOR MEASURING FILM THICKNESS

[75] Inventor: Noriyuki Kondo, Kyoto, Japan

[73] Assignee: Dainippon Screen Mfg. Co., Ltd., Kyoto, Japan

[ * ] Notice: The portion of the term of this patent subsequent to Jan. 15, 2008 has been disclaimed.

[21] Appl. No.: 652,358

[22] Filed: Feb. 6, 1991

Related U.S. Application Data

[63] Continuation of Ser. No. 377,395, Jul. 10, 1989, abandoned.

[30] Foreign Application Priority Data

Jul. 12, 1988 [JP] Japan ................... 63-174361

[51] Int. Cl.⁵ .............. G01N 21/55; G01B 11/06
[52] U.S. Cl. .................. 250/372; 250/341; 356/381; 356/357
[58] Field of Search ........... 250/372, 341; 356/381, 356/357

[56] References Cited

U.S. PATENT DOCUMENTS

| | | |
|---|---|---|
| 2,929,257 | 2/1960 | Friedman. |
| 3,565,531 | 2/1971 | Kane et al. ............ 356/381 |
| 4,555,767 | 11/1985 | Case et al. ............ 356/381 |
| 4,623,254 | 11/1986 | Imose ................. 356/381 |
| 4,859,064 | 8/1989 | Messerschmidt et al. ..... 250/341 |
| 4,899,055 | 2/1990 | Adams ................ 250/372 |
| 4,984,894 | 1/1991 | Kondo ................ 356/357 |

Primary Examiner—Carolyn E. Fields
Assistant Examiner—Drew A. Dunn
Attorney, Agent, or Firm—Lowe, Price, Leblanc & Becker

[57] ABSTRACT

Light in the ultraviolet region is applied toward a transparent thin film of an object sample to measure energy of light reflected by the object sample. On the basis of the measured energy value, the thickness of the transparent thin film on the object sample can thus be correctly measured even if the film thickness is not more than 10 nm. In the preferred embodiment, an optical system is included to enable monitoring of a position of the thin transparent film. In one aspect of the invention visible light reflected from the transparent film is used to form an image to facilitate such monitoring.

3 Claims, 6 Drawing Sheets

METHOD OF AND APPARATUS FOR MEASURING FILM THICKNESS

This application is a continuation of application Ser. No. 07/377,395 filed Jul. 10, 1989, now abandoned.

BACKGROUND OF THE INVENTION

1. Field of the Invention

The present invention relates to a method and an apparatus for correctly measuring optically the thickness of a transparent thin film formed on a substrate.

2. Background of the Prior Art

In a film thickness inspection of a semiconductor manufacturing process or the like, it is necessary to measure the thickness of a silicon oxide film which is formed on a silicon substrate, for example, in a non-contact manner. In order to measure such film thickness, generally employed are a method (hereinafter referred to as the "polarization analyzing system") of measuring a change in a polarized state of reflected light and obtaining the film thickness from such change and another method (hereinafter referred to as the "reflected light energy measuring system") of irradiating a sample to be measured with light for measuring the energy of light reflected by the sample to thereby obtain the film thickness from the energy.

In the polarization analyzing system, light is applied to a sample obliquely from above for measuring the thickness of a transparent thin film formed on the sample. Thereafter, detected are change in a polarized state of light reflected by the sample to be measured (i.e., change in relative phase shift between the P wave, which is a vibration component parallel to the plane of incidence, and the S wave, which is a vibration component perpendicular to the plane of incidence) and change in the amplitude ratio between the waves. Further, the thickness of the transparent thin film is obtained on the basis of the detected change. This polarization analyzing system is applied to an ellipsometer, for example, so that the thickness of a thin film formed on a sample to be measured can be accurately measured by the ellipsometer in a non-contact manner even if the film thickness is not more than 10 nm. However, it is difficult to measure a region to be measured while limiting the same in a narrow range. Thus, the reflected light energy measuring system, which is described below, is generally employed in a semiconductor manufacturing process.

When light is applied to a sample to be measured, light reflected by the surface of a transparent thin film formed on the sample interferes with that reflected by the surface of a substrate of the sample, whereby constant relation holds between the energy of the reflected light and the thickness of the transparent thin film. In reflected light energy measuring system, the thickness of the thin film is obtained on the basis of such relation.

In more concrete terms, the thickness of the transparent thin film is obtained as follows: First, samples (hereinafter referred to as "first standard samples") provided with transparent thin films having different thickness values are prepared in order to obtain correlation data of energy of reflected light and thickness values of the transparent thin films. Optical constants of the transparent thin films and substrates of the first standard samples are identical to those of a sample to be measured, and the thickness values of the transparent thin films of the first standard samples are known, respectively. Visible light is applied to the respective standard samples to measure energy of light reflected by the surface of the standard samples, to thereby obtain correlation data of the energy of the reflected light and the thickness values of the transparent thin films. Thus, prepreparation is completed. Then, visible light is applied to the sample to be measured, in order to measure energy of light reflected by the sample to be measured. Finally, the thickness of a thin film formed on this sample is obtained on the basis of the measured values and the correlation data.

As understood from the above, the reflected light energy must be significantly changed in response to change in film thickness, so that the film thickness can be correctly measured by the reflected light energy measuring system. In general, most of thin films formed on semiconductor substrates are at least 40 nm in thickness, and the reflected light energy is significantly changed even if the amount $\Delta d$ of change in film thickness is very small. Thus, it has been possible to measure the thickness of such a thin film to a relatively high accuracy by the reflected light energy measuring system.

Figure 1:
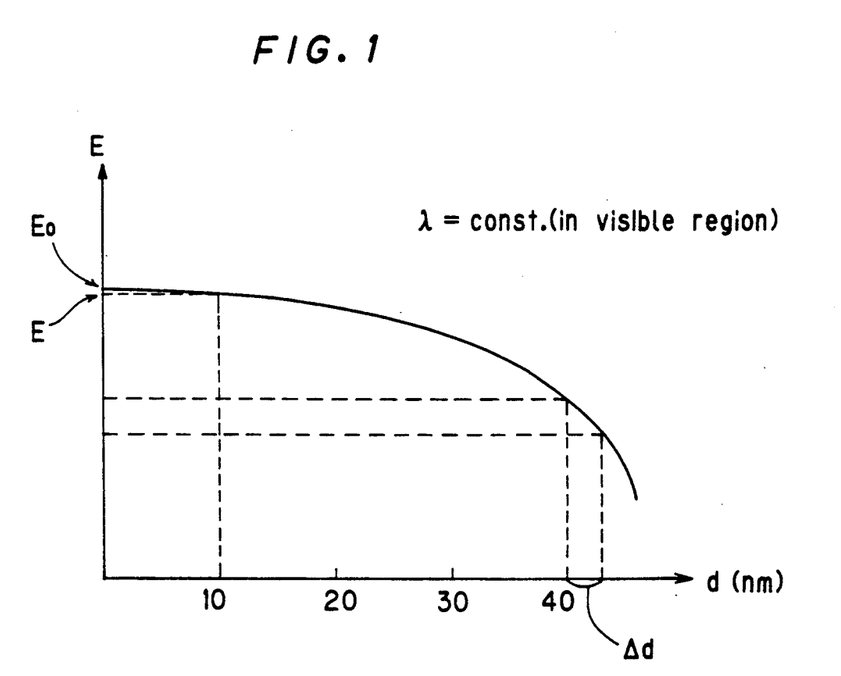
FIG. 1 illustrates relations between energy of visible light reflected by an object sample and the thickness of a transparent thin film on the object sample.

The thickness of a thin film has been reduced with recent improvement in semiconductor manufacturing technique, and it has been increasingly demanded to accurately measure such film thickness also within a range of not more than 10 nm. However, it is impossible to correctly measure film thickness of not more than 10 nm by the reflected light energy measuring system. The reason for this is that energy of light reflected by a thin film of not more than 10 nm in thickness is approximate to energy $E_O$ of light reflected by a sample (hereinafter referred to as "second standard sample") which is provided with no transparent thin film. In other words, energy of reflected light is substantially constant within a range of 0 to 10 nm in thickness. In more concrete terms, the energy of reflected light is theoretically provided as E in the case of film thickness of 10 nm, for example, as shown in FIG. 1, while actually measured energy of the reflected light includes a measurement error, to thereby be not identical to the theoretical value E. As understood from FIG. 1, variation in energy with respect to change in film thickness is small around film thickness of 10 nm, particularly that of not more than 10 nm. Therefore, film thickness obtained on the basis of the energy value including the aforementioned measurement error may significantly differ from the true film thickness.

SUMMARY OF THE INVENTION

The present invention is directed to a method of and an apparatus for measuring the thickness of a transparent thin film of an object sample to be measured which comprises a substrate and the transparent thin film provided on the substrate.

According to the present invention, the method includes: a first step of applying light in the ultraviolet region, having a wavelength less than 240 nm, toward the transparent thin film to measure energy of light reflected by the object sample; and second step of obtaining the thickness of the transparent thin film on the basis of the energy measured in the first step.

The apparatus comprises: (a) means for applying light in the ultraviolet region toward a transparent thin film on the sample; (b) means for measuring energy of light reflected by the object sample; (c) means for obtaining the thickness of the transparent thin film on the basis of the energy value measured by the measuring means.

Accordingly, an object of the present invention is to provide a method of and an apparatus for correctly measuring the thickness of a transparent thin film of the object sample even if the thickness thereof is not more than 10 nm.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Principle of the Invention

Figure 2:
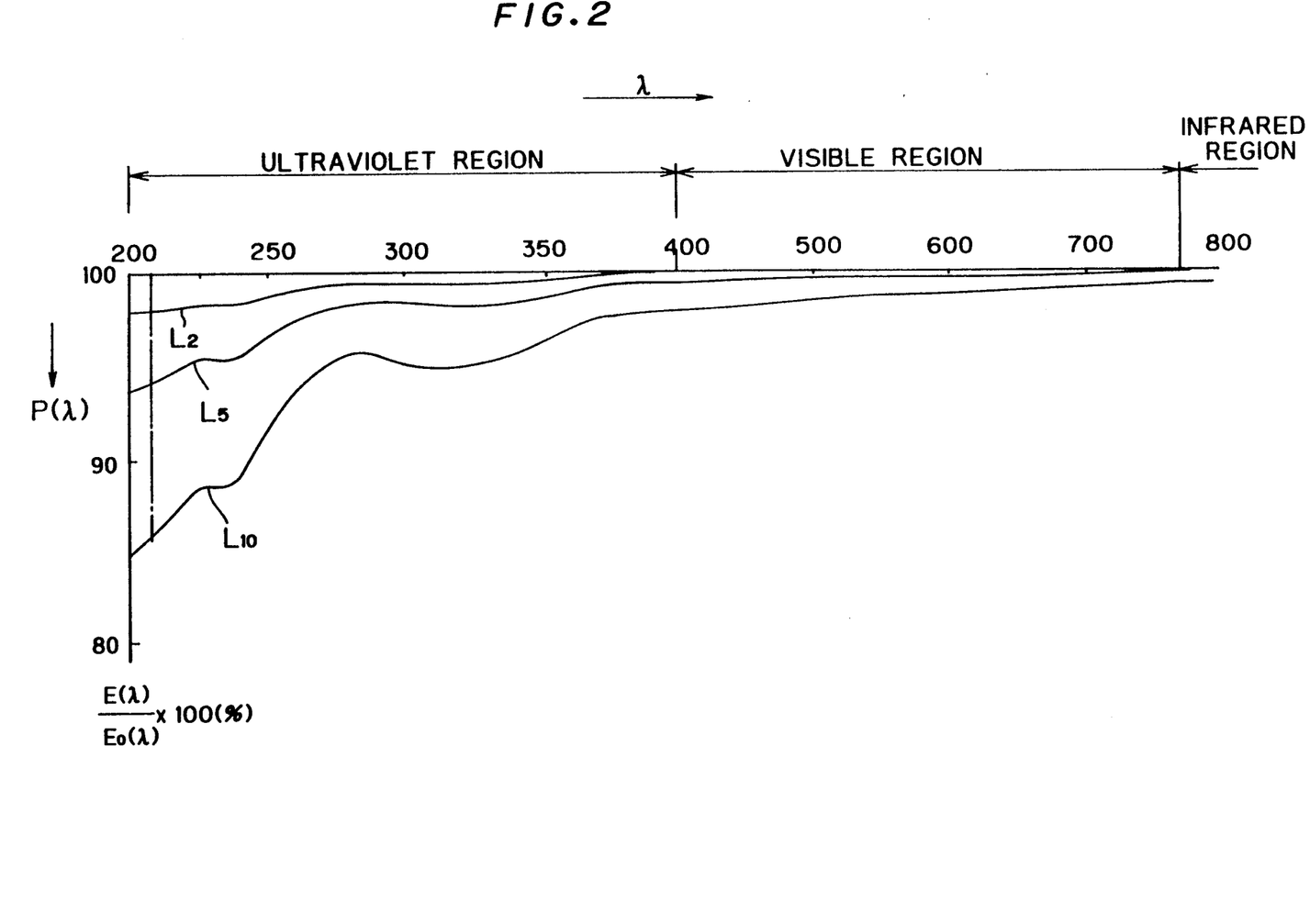
FIG. 2 illustrates relations between reflected light energy percentage $P(\lambda)$ and wavelength $\lambda$.

In order to solve the aforementioned technical problem, various researches have been made to obtain the results shown in FIG. 2. FIG. 2 illustrates relations between reflected light energy percentage $P(\lambda)$ and wavelength $\lambda$. In more concrete terms, the relations have been obtained in the following manner: Light was applied to a silicon substrate to obtain energy $E_0(\lambda)$ of light reflected by the silicon substrate, while light was also applied to samples comprising silicon substrates and $SiO_2$ films of prescribed thickness values (2 nm, 5 nm and 10 nm) provided on the silicon substrates, respectively to obtain values of energy $E(\lambda)$ of light reflected by the respective samples. Then, the reflected light energy percentage $P(\lambda)$ was obtained on the basis of the following expression:

$$P(\lambda) = \frac{E(\lambda)}{E_0(\lambda)} \cdot 100 \quad (1)$$

Solid lines $L_2$, $L_5$ and $L_{10}$ in FIG. 2 show relations between the reflected light energy percentage $P(\lambda)$ and the wavelength $\lambda$ in the case that the $SiO_2$ films of 2 nm, 5 nm and 10 nm in thickness are formed on the silicon substrates, respectively.

Table 1 lists some of values of the reflected light energy percentage $P(\lambda)$ with respect to the wavelength $\lambda$ obtained in the aforementioned manner.

TABLE 1

| thickness value (nm) | λ (nm) | | | | | |
|---|---|---|---|---|---|---|
| | 207 | 256 | 316 | 407 | 500 | 596 |
| 2 | 97.93 | 98.97 | 99.41 | 99.87 | 99.91 | 99.95 |
| 5 | 93.98 | 97.00 | 98.12 | 99.34 | 99.54 | 99.67 |
| 10 | 85.30 | 92.53 | 94.92 | 97.66 | 98.24 | 98.72 |

TABLE 1-continued

| thickness value (nm) | λ (nm) | | | | | |
|---|---|---|---|---|---|---|
| | 207 | 256 | 316 | 407 | 500 | 596 |
| 20 | 66.41 | 79.70 | 84.56 | 91.25 | 93.19 | 94.95 |

In order to obtain the aforementioned relations, optical constants of silicon and $SiO_2$ were determined on the basis of "Handbook of Optical Constants of Solids".

Analyzing FIG. 2 and Table 1, the following first to third phenomena have been ascertained:

FIRST PHENOMENON

In the visible and infrared regions ($\lambda$ = 400 to 900 nm), the reflected light energy percentage $P(\lambda)$ is reduced as the wavelength $\lambda$ is shortened (hereinafter referred to as "first phenomenon") under the condition that the film thickness is constant. Noting the solid line $L_{10}$ in FIG. 2, for example, the reflected light energy percentage $P(596)$ with respect to the wavelength of 596 nm is 98.72%, while the reflected light energy percentage $P(\lambda)$ is reduced as the wavelength $\lambda$ is shortened such that the reflected light energy percentage $P(407)$ with respect to the wavelength of 407 nm is 97.66%, as shown in FIG. 2 and Table 1. As understood from FIG. 2, detection accuracy for the film thickness is advantageously improved as the wavelength of light is reduced within such a wavelength range. However, since variation in reflected light energy percentage $P(\lambda)$ with respect to that in wavelength $\lambda$ is small, it is difficult to attain the object of the present invention through the first phenomenon in practice.

SECOND PHENOMENON

In the ultraviolet region ($\lambda$ = 200 to 400 nm), the reflected light energy percentage $P(\lambda)$ is extremely reduced as the wavelength $\lambda$ is shortened under the condition that the film thickness is constant. It means that the energy $E(\lambda)$ is remarkably reduced as compared with the energy $E_0(\lambda)$ (this phenomenon is hereinafter referred to as "second phenomenon"), as understood from the expression (1). Noting the solid line $L_{10}$ in FIG. 2, for example, the reflected light energy percentage $P(407)$ with respect to the wavelength of 407 nm is 97.66%, while the reflected light energy percentage $P(207)$ with respect to the wavelength of 207 nm is 85.30%, as shown in FIG. 2 and Table 1.

In the ultraviolet region ($\lambda$ = 200 to 400 nm), therefore, the energy $E(\lambda)$ of the light reflected by the samples provided with $SiO_2$ films of not more than 10 nm in thickness is remarkably reduced as compared with the energy $E_0(\lambda)$ of the light reflected by the silicon substrates.

THIRD PHENOMENON

In the ultraviolet region ($\lambda$ = 200 to 400 nm), the reflected light energy percentage $P(\lambda)$ is extremely changed as the $SiO_2$ films are increased in thickness (this phenomenon is hereinafter referred to as "third phenomenon") under the condition that the wavelength $\lambda$ is constant as one-dot chain line in FIG. 2 shows.

This can be easily understood also from Table 1. Assuming that the wavelength $\lambda$ is 596 nm, for example, reflected light energy percentage $P_{(at\ 2\ nm)}$ is 99.95% when the film thickness is 2 nm, while reflected light energy percentage $P_{(at\ 10\ nm)}$ is 98.72% when the film thickness is 10 nm. Therefore, the reflected light energy percentage $P(\lambda)$ is changed by only about 1% under the aforementioned condition. Assuming that the wavelength $\lambda$ is 207 nm, on the other hand, the reflected light energy percentage $P_{(at\ 2\ nm)}$ is 97.93% and the reflected light energy percentage $P_{(at\ 10\ nm)}$ is 85.30%. Thus, the third phenomenon is clearly understood also from Table 1.

While the above description has been made on the relation between the reflected light energy percentage $P(\lambda)$ and the film thickness, phenomonons similar to the above are recognized also between the energy $E(\lambda)$ of the reflected light and the film thickness when the wavelength $\lambda$ is constant. That is, values $P_1(\lambda_1)$, $P_2(\lambda_1)$, ... of reflected light energy percentage with respect to values $d_1, d_2, ...$ of film thickness under the condition that the wavelength is constant ($\lambda = \lambda_1$) are respectively obtained as follows:

$$P_1(\lambda_1) = \frac{E_1(\lambda_1)}{E_0(\lambda_1)} \cdot 100$$
$$P_2(\lambda_1) = \frac{E_2(\lambda_1)}{E_0(\lambda_1)} \cdot 100$$
...
... (2)

As understood from the expressions (2), energy $E_0(\lambda_1)$ of the light reflected by the silicon substrates is constant, and hence the energy $E(\lambda)$ of the reflected light is extremely changed as the $SiO_2$ films are increased in thickness, similarly to the third phenomenon.

The aforementioned second and third phenomena were also observed when the thickness values of the $SiO_2$ films were at least 10 nm. While the above description has been made with respect to the case where the $SiO_2$ films were formed on the silicon substrates, similar phenomena were also recognized in other case.

Table 2 shows relations between reflected light energy percentage $P(\lambda)$ and wavelength $\lambda$ with respect to silicon substrates provided with $Si_3N_4$ films.

TABLE 2

| thickness value (nm) | λ (nm) | | | | | |
|---|---|---|---|---|---|---|
| | 207 | 256 | 316 | 407 | 500 | 596 |
| 2 | 89.84 | 96.54 | 98.23 | 99.62 | 99.78 | 99.86 |
| 5 | 66.57 | 89.29 | 94.34 | 98.23 | 98.84 | 99.20 |
| 10 | 18.00 | 70.26 | 84.25 | 93.73 | 95.64 | 96.95 |
| 20 | 62.48 | 29.22 | 48.73 | 76.00 | 83.10 | 87.97 |

Table 3 shows relations between reflected light energy percentage $P(\lambda)$ and wavelength $\lambda$ with respect to GaAs substrates provided with $SiO_2$ films.

TABLE 3

| thickness value (nm) | λ (nm) | | | | | |
|---|---|---|---|---|---|---|
| | 207 | 256 | 316 | 407 | 550 | 596 |
| 2 | 96.68 | 98.91 | 98.80 | 99.45 | 99.80 | 99.87 |
| 5 | 90.54 | 96.69 | 96.38 | 98.32 | 99.26 | 99.48 |
| 10 | 77.64 | 91.43 | 90.78 | 95.63 | 97.70 | 98.34 |
| 20 | 52.69 | 75.46 | 74.14 | 87.23 | 92.17 | 94.20 |

Table 4 shows relations between reflected light energy percentage $P(\lambda)$ and wavelength $\lambda$ with respect to GaAs substrates provided with $Si_3N_4$ films.

TABLE 4

| thickness value (nm) | λ (nm) | | | | | |
|---|---|---|---|---|---|---|
| | 207 | 256 | 316 | 407 | 550 | 596 |
| 2 | 84.88 | 96.41 | 96.44 | 98.45 | 99.47 | 99.65 |
| 5 | 54.02 | 88.73 | 89.39 | 95.28 | 98.07 | 98.70 |
| 10 | 6.22 | 68.61 | 73.01 | 87.68 | 94.12 | 95.92 |
| 20 | 67.65 | 15.23 | 27.66 | 63.37 | 80.07 | 85.93 |

Table 5 shows relations between reflected light energy percentage $P(\lambda)$ and wavelength $\lambda$ with respect to Al substrates provided with $SiO_2$ films.

TABLE 5

| thickness value (nm) | λ (nm) | | | | | |
|---|---|---|---|---|---|---|
| | 207 | 256 | 316 | 407 | 550 | 596 |
| 2 | 99.50 | 99.69 | 99.8 | 99.89 | 99.92 | 99.95 |
| 5 | 98.56 | 99.12 | 99.45 | 99.68 | 99.79 | 99.84 |
| 10 | 96.50 | 97.86 | 98.67 | 99.23 | 99.48 | 99.62 |
| 20 | 92.81 | 94.49 | 96.44 | 97.93 | 98.65 | 98.98 |

Table 6 shows relations between reflected light energy percentage $P(\lambda)$ and wavelength $\lambda$ with respect to Al substrates provided with $Si_3N_4$ films.

TABLE 6

| thickness value (nm) | λ (nm) | | | | | |
|---|---|---|---|---|---|---|
| | 207 | 256 | 316 | 407 | 550 | 596 |
| 2 | 95.08 | 98.90 | 99.40 | 99.67 | 97.76 | 99.84 |
| 5 | 80.87 | 96.52 | 98.19 | 99.02 | 99.37 | 99.53 |
| 10 | 48.08 | 89.79 | 95.10 | 97.53 | 98.46 | 98.87 |
| 20 | 76.27 | 82.39 | 84.15 | 92.18 | 95.45 | 96.81 |

Table 7 shows relations between reflected light energy percentage $P(\lambda)$ and wavelength $\lambda$ with respect to Cr substrates provided with $SiO_2$ films.

TABLE 7

| thickness value (nm) | λ (nm) | | | | | |
|---|---|---|---|---|---|---|
| | 207 | 256 | 316 | 407 | 500 | 596 |
| 2 | 94.26 | 97.35 | 98.75 | 99.37 | 99.61 | 99.67 |
| 5 | 84.43 | 92.75 | 96.57 | 98.26 | 98.92 | 99.13 |
| 10 | 66.49 | 83.68 | 92.09 | 95.98 | 97.47 | 97.97 |
| 20 | 45.70 | 64.84 | 80.61 | 89.83 | 93.48 | 94.82 |

Table 8 shows relations between reflected light energy percentage $P(\lambda)$ and wavelength $\lambda$ with respect to Cr substrates provided with $Si_3N_4$ films.

TABLE 8

| thickness value (nm) | λ (nm) | | | | | |
|---|---|---|---|---|---|---|
| | 207 | 256 | 316 | 407 | 500 | 596 |
| 2 | 74.20 | 91.04 | 96.19 | 98.18 | 98.91 | 99.12 |
| 5 | 31.50 | 74.17 | 89.03 | 94.84 | 96.92 | 97.55 |
| 10 | 9.08 | 41.43 | 72.90 | 87.50 | 92.59 | 94.21 |
| 20 | 104.27 | 48.31 | 36.43 | 65.14 | 79.45 | 84.48 |

Procedures for deriving the values shown in these Tables are identical to that of Table 1. Optical constants of GaAs and $Si_3N_4$ are determined on the basis of "Handbook of Optical Constants of Solids" and that of Al is determined on the basis of "Physics Daten Physics Data, Optical Properties of Metals 1981 Nr. 18-2", while that of Cr is determined on the basis of "Physics Daten Physics Data, Optical Properties of Metals 1981 Nr. 18-1".

As hereinabove described, the energy $E(\lambda)$ of light reflected by a sample to be measured is remarkably reduced as compared with the energy $E_0(\lambda)$ when light of the ultraviolet region is applied to the sample even if the film thickness is not more than 10 nm, while the energy $E(\lambda)$ of the reflected light is extremely changed in response to slight change in thickness within the range of the film thickness of not more than 10 nm. Therefore, the thickness of a transparent thin film can be correctly measured through the light of the ultraviolet region even if the film thickness is not more than 10 nm, in addition to the case of film thickness of at least 10 nm.

B. The First Preferred Embodiment

Figure 3:
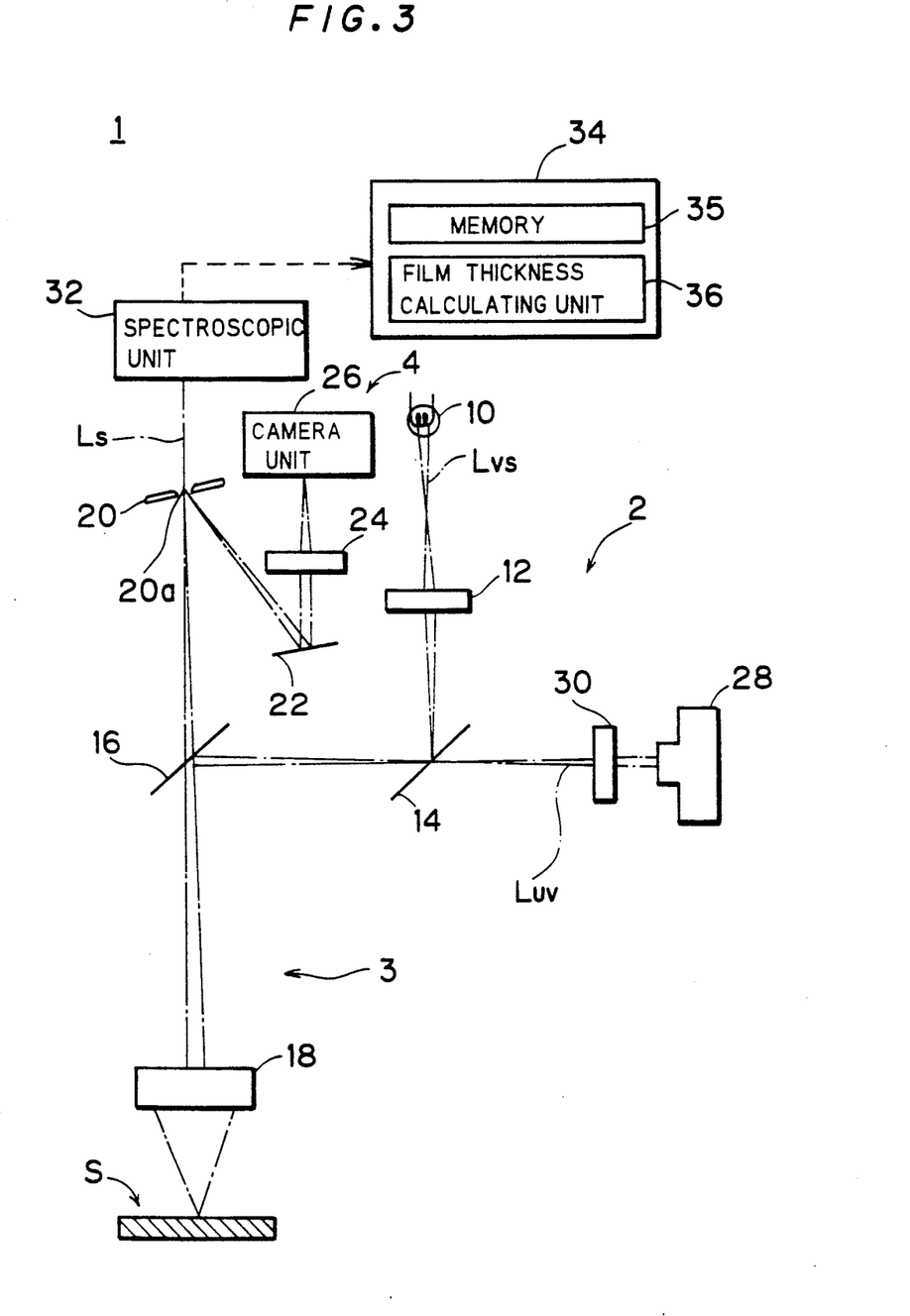
FIG. 3 is a schematic block diagram showing a film thickness measuring apparatus according to a preferred embodiment of the present invention.

FIG. 3 is a schematic block diagram showing a film thickness measuring apparatus 1 according to a preferred embodiment the present invention. As shown in FIG. 3, the film thickness measuring apparatus 1 is formed by an illumination optical system 2, a microscopic optical system 3, a reflecting mirror 20, a spectroscopic unit 32, a monitoring optical system 4, an arithmetic unit 34 and a control unit (not shown) for controlling the entire apparatus.

The illumination optical system 2 comprises a light source 10 such as a halogen lamp, for example, emitting visible light $L_{VS}$, a lens 12 and a shutter mirror 14 which is vertically reciprocable with respect to the plane of the figure, so that visible light $L_{VS}$ outgoing from the light source 10 is guided to the microscopic optical system 3 through the lens 12 and the shutter mirror 14. The illumination optical system 2 also comprises a light source 28 emitting ultraviolet light and a lens 30, so that ultraviolet light $L_{UV}$ can be guided to the microscopic optical system 3 in place of the visible light $L_{VS}$.

The light source 28 may apply light of a specific ultraviolet region, and can be prepared by a deuterium lamp, a mercury lamp, an ultraviolet laser irradiator, a xenon lamp or the like.

The microscopic optical system 3 is formed by a half mirror 16 and a mirror type image formation element 18.

Therefore, when the shutter mirror 14 is on an optical axis as shown in FIG. 3, the visible light $L_{VS}$ outgoing from the light source 10 is applied to the surface of an object sample S to be measured through the lens 12, the shutter mirror 14, the half mirror 16 and the mirror type image formation element 18. When the shutter mirror 14 is evacuated from the optical axis, on the other hand, the ultraviolet light $L_{UV}$ outgoing from the light source 28 is applied to the surface of the object sample S through the lens 30, the half mirror 16 and the mirror type image formation element 18.

A beam reflected by the surface of the object sample S is enlargedly imaged in a position close to the reflecting mirror 20 through the image formation element 18 and the half mirror 16.

The reflecting mirror 20 is provided with a pinhole 20a. Within the reflected beam, therefore, reflected light $L_S$ passing through the pinhole 20a is incorporated in the spectroscopic unit 32.

The spectroscopic unit 32 is formed by a diffraction grating (not shown) for separating the reflected light $L_S$ into its spectral components and an optical detector (not shown) for detecting the spectrum. Therefore, the spectroscopic unit 32 detects the spectrum of the light $L_S$ incorporated therein, and supplies a signal corresponding to the spectrum of the light $L_S$ to the arithmetic unit 34. The arithmetic unit 34 is formed by a memory 35 and a film thickness calculating unit 36, to calculate the film thickness of the object sample S on the basis of the signal outputted from the spectroscopic unit 32.

Within the reflected beam, on the other hand, light reflected by the reflecting mirror 20 is incident upon the monitoring optical system 4, and imaged in a camera unit 26 through a mirror 22 and the image formation lens 24. Thus, the camera unit 26 picks up an enlarged image of the surface of the object sample S and projects the same on a CRT (not shown). Confirmation of the position of measurement and focusing of optical system of the apparatus 1 can be performed on the basis of the enlarged image. Although visible light is employed in order to confirm the position for measuring the film thickness of the object sample S and to focus the optical system in the aforementioned apparatus, the surface of the object sample S can also be observed through ultraviolet light. Thus, the light source 10, the lens 12 and the shutter mirror 14 are optional elements of the present invention.

Figure 4:
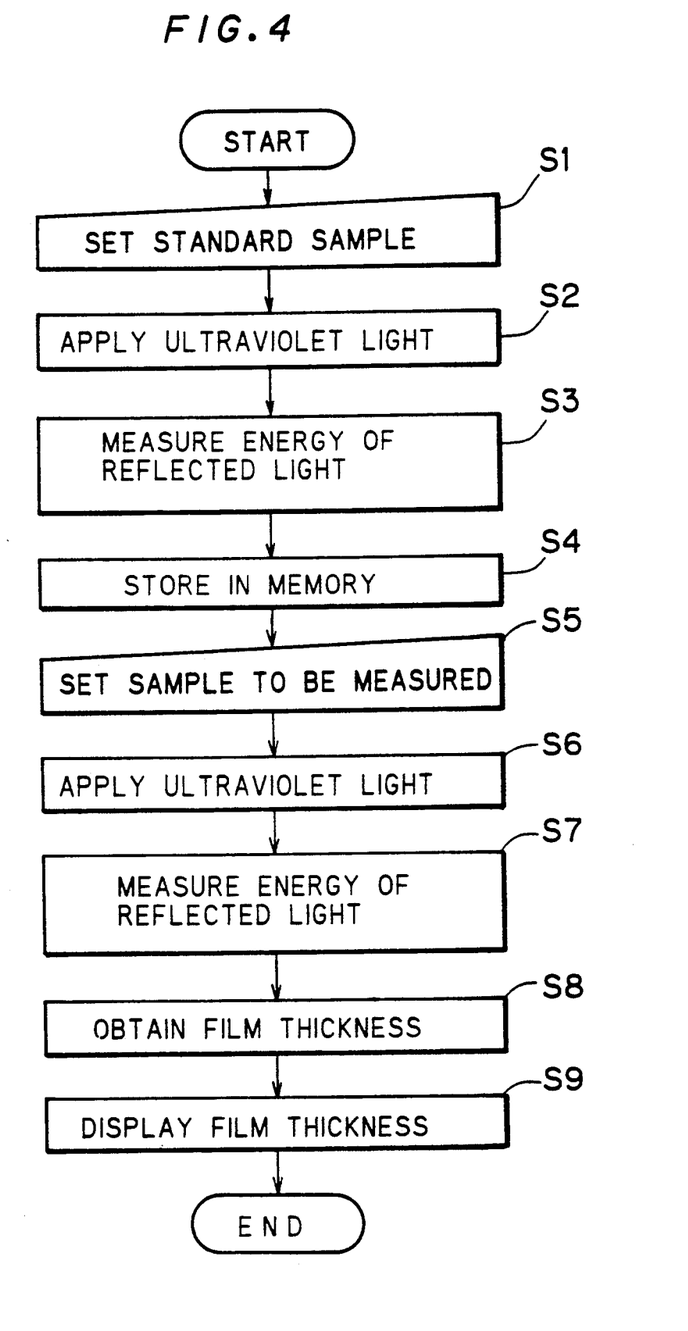
FIG. 4 is a flow chart showing a method of measuring film thickness by the film thickness measuring apparatus shown in FIG. 3.

FIG. 4 is a flow chart showing a method of measuring film thickness by the film thickness measuring apparatus 1. A plurality of first standard samples, which comprise substrates and transparent thin films whose optical constants are identical to those of the object sample with known thickness values of the transparent thin films, are prepared. Energy levels with respect to specific wavelengths of light reflected by the first standard samples in the ultraviolet region are measured, to thereby obtain correlation data of energy levels $E(\lambda)$ of the reflected light and thickness values d of the transparent thin films previous to film thickness measurement by the film thickness measuring apparatus 1. Schematically stated, the first one of the first standard samples is set in a prescribed position of the film thickness measuring apparatus 1 (step S1) and then ultraviolet light $L_{UV}$ outgoing from the light source 28 is applied to the first standard sample (step S2), to thereby measure the energy $E(\lambda)$ of the light reflected by the first standard sample by the spectroscopic unit 32 (step S3). The data corresponding to the energy value $E(\lambda)$ is stored in the memory 35 in correspondence to the thickness value d (step S4). Thereafter the steps S1 to S4 are sequentially repeated with respect to the plurality of first standard samples having different thickness values, to thereby store correlation data of the energy values E and the thickness value d.

The data are so stored in the memory 35 that, when the energy of the light reflected by one sample is read as an address, the thickness value of the transparent thin film of the sample is outputted. However, the method of storing the data is not restricted to this.

Upon completion of the aforementioned prepreparation, the film thickness of the object sample S is measured as follows: An operator sets the object sample S in a prescribed position as shown in FIG. 3 (step S5). At this time, the light source 10 is turned on in accordance with a command from the operator, so that an image of the surface of the object sample S picked up by the camera unit 26 is projected on the CRT. The operator can confirm the position of the object sample S and focuses the optical system of the apparatus 1 on the basis of the image projected on the CRT, to thereby correctly specify the position of measurement.

Thereafter the operator supplies a measurement start command to the control unit, so that steps S6 to S9 are executed in response to a command from the control unit. That is, the light source 28 is turned on and the shutter mirror 14 is evacuated from the optical axis of the ultraviolet light $L_{UV}$, so that the ultraviolet light $L_{UV}$ outgoing from the light source 28 is applied to the surface of the object sample S (step S6).

The wavelength of the light applied to the object sample S must be identical to that of the light applied to the first standard samples at the step S2. The wavelength, which may be arbitrarily determined so far as the same is within the ultraviolet region, is preferably within a range of 180 to 240 nm in view of the properties of the light source 28 etc.

The ultraviolet light applied to the surface of the object sample S is reflected by the said surface, and the spectroscopic unit 32 measures energy $E(\lambda)$ of the reflected light $L_S$ (step S7). Thus, a signal relating to the energy $E(\lambda)$ of the reflected light $L_S$ detected by the spectroscopic unit 32 is supplied to the arithmetic unit 34. Film thickness calculating unit 36 provided in the arithmetic unit 34 obtains the thickness of the transparent thin film formed on the object sample S on the basis of the signal relating to the energy $E(\lambda)$ (step S8). That is, when an address corresponding to the signal supplied to the arithmetic unit 34 is present in the memory 35, a film thickness value stored in the said address is read and displayed on a display unit (not shown) as the thickness of the transparent thin film (step S9). If there is no corresponding address, on the other hand, an address approximate to the energy value measured at the step S27 is accessed to read the film thickness value stored in the said address, and interpolation operation is made in the film thickness calculating unit 36 so that the result of the operation is displayed on the display unit as the thickness of the transparent thin film formed on the object sample S (step S9). Or, only an address most approximate to the value actually measured at the step S7 may be accessed to assume the film thickness value stored in the said address as the thickness of the transparent thin film. In this case, however, measurement accuracy is slightly inferior to that in the aforementioned interpolation operation case.

According to the first embodiment of the present invention, as hereinabove described, the energy of the reflected light is measured through the light of the ultraviolet region, whereby the thickness of the transparent thin film can be correctly measured even if the thickness is not more than 10 nm, in addition to the case of the thickness of at least 10 nm.

Since the thickness of the thin film is measured in the above manner in the first embodiment, the optical constants of the transparent thin film and the substrate of the object sample S may be unknown.

The thickness values of the transparent thin films formed on the standard first samples must be known and may be previously actually measured by an ellipsometer, for example. However, when the thickness values of the transparent thin films formed on the first standard samples are previously measured by the ellipsometer, it is difficult to specify measured positions of the first standard samples as hereinabove described, and hence the standard samples must be uniformly provided with the transparent thin films over considerably wide ranges. On the other hand, the transparent thin film of the object sample S may be formed on a narrow specific position of the object sample S. This is because the position of the object sample S can be easily and correctly specified as obvious from the fact that the optical axis of the camera unit 26 for picking up the image of the object sample S is arranged to coincide with the optical axis of the optical system (image formation element 18) for measuring the energy values of the reflected light in the apparatus for carrying out the inventive method, as shown in FIG. 3.

Although the first standard samples are prepared to carry out the steps S1 to S4 for obtaining correlation between the film thickness values and the energy values of the reflected light in the first embodiment, such correlation may be obtained by another method. For example, the correlation may be calculated by arithmetic processing on the basis of the optical constants of the object sample S, the properties of the light source 28 and the like, to be stored in the memory 35.

C. The Second Preferred Embodiment

The absolute reflectance $R_S$ of an object sample S to be measured is univocally determined upon provision of a refractive index $n_0$ and an absorption coefficient $k_0$ of an incident-side medium (air in general, since film thickness is measured in the atmospheric air), a refractive index $n_1$ and an absorption coefficient $k_1$ of a transparent thin film, a refractive index $n_2$ and an absorption coefficient $k_2$ of the substrate, wavelength $\lambda$ and an incident angle $\phi$ of illumination light and thickness $d_x$ of the transparent thin film. Therefore, when these values $n_0$, $n_1$, $n_2$, $k_0$, $k_1$, $k_2$, $\lambda$ and $\phi$ are specified, the thickness $d_x$ can be obtained on the basis of the value of the absolute reflectance $R_S$. Although it is not easy to actually measure the absolute reflectance $R_S$ of the object sample S, the absolute reflectance $R_S$ can be calculated from the energy of light reflected by the object sample S. Thus, the thickness of the thin film formed on the object sample S can be measured on the basis of the aforementioned principle of film thickness measurement.

A film thickness measuring apparatus according to a second embodiment of the present invention has a film thickness calculating unit which is different from that of the first embodiment, and carries out film thickness measurement while controlling the overall apparatus as hereinafter described by a control unit. Structure other than the film thickness calculating unit is identical to that of the first embodiment. Therefore, the film thickness measuring apparatus according to the second embodiment is not shown in the figure but a film thickness measuring method according to the second embodiment is described with numerals identical to those in the first embodiment.

Figure 5:
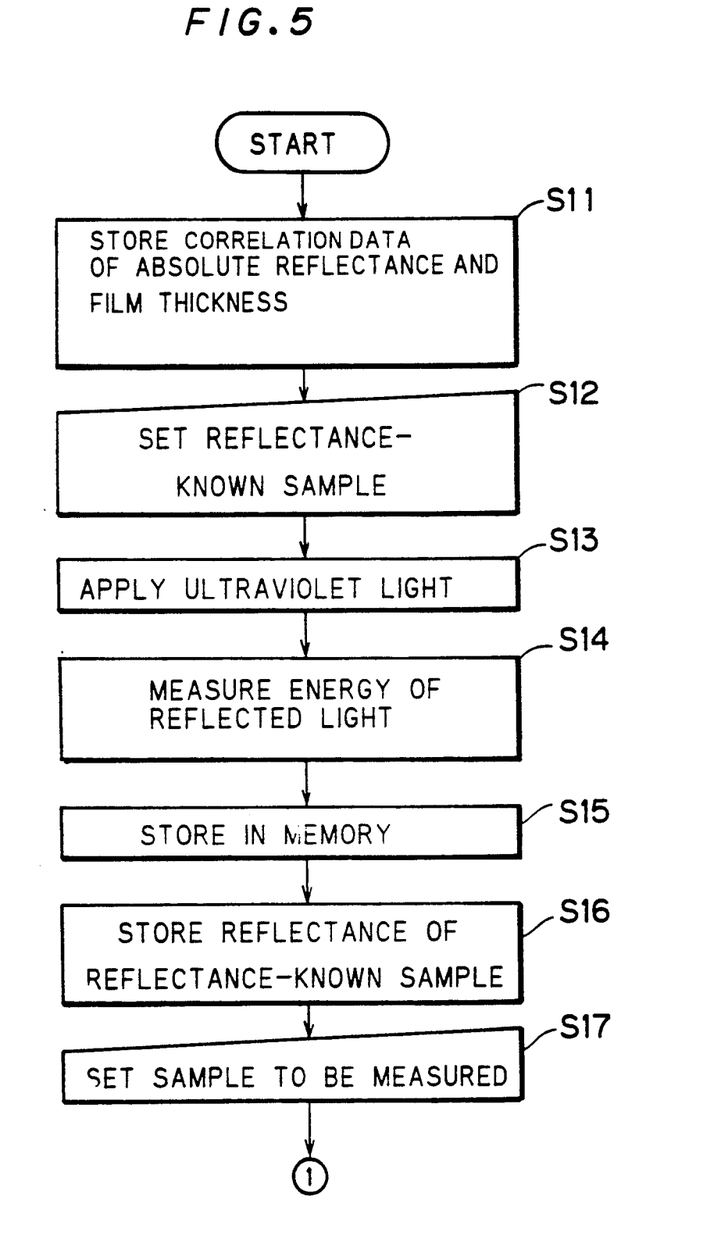
FIG. 5 is a flow chart showing the film thickness measuring method according to a second embodiment of the invention.

FIG. 5 is a flow chart showing the film thickness measuring method according to the second embodiment. First, as prepreparation for measurement of thickness of a transparent thin film provided in the object sample, an operator inputs correlation data of the absolute reflectance $R_S$ and the film thickness $d_x$ on the basis of literature such as Handbook of Optical Constants of Solids, Academic Press, for example, through a keyboard (not shown) to store the same in a memory 35. Similarly to the first embodiment, the correlation data are so stored that corresponding film thickness is outputted upon addressing with the absolute reflectance $R_S$.

As the prepreparation, further, the operator sets a sample P (hereinafter referred to as "reflectance-known sample"), at least the absolute reflectance of which is known, in the measuring apparatus (step S12). Preferably the absolute reflectance of the reflectance-known sample P, which may be arbitrarily prepared so far as its absolute reflectance is clear, is not extremely different from that of the object sample S. Thus, the reflectance-known sample P may be prepared from the same material as the substrate of the object sample S. Ultraviolet light $L_{UV}$ is applied to the sample S (step S13), to measure energy $E_P$ of a specific wavelength of light reflected by the reflectance-known sample P in the ultraviolet region (step S14). The measured energy $E_P$ is stored in the memory 35 (step S15). The operator further inputs the absolute reflectance $R_P$ of the reflectance-known sample P through the keyboard to store the same in the memory 35 (step S16).

Then the operator sets the object sample S in the measuring apparatus (step S17). At this time, the position of measurement can be correctly specified similarly to the first embodiment. Thereafter the operator supplies a measurement command to the control unit, whereby steps S18 to S22 are carried out in response to a command from the control unit. That is, the ultraviolet light $L_{UV}$ is applied to the surface of the object sample S (step S18), and energy $E_S$ of the light reflected by the said surface is measured by a spectroscopic unit 32 (step S19).

A signal relating to the energy $E_S$ of the reflected light is supplied from to the spectroscopic unit 32 the arithmetic unit 34, while the values of the energy $E_P$ and the absolute reflectance $R_P$ are read from the memory 35, so that absolute reflectance $R_S$ of the object sample S is operated on the basis of the following expression (step S20):

$$R_S = (R_P/E_P) \cdot E_S \quad (3)$$

The reason why the absolute reflectance $R_S$ is obtained from the expression (3) is as follows: It is generally known that the following relation holds between the energy $E_P$ of the light reflected by the reflectance-known sample P and the absolute reflectance $R_P$ of the reflectance-known sample:

$$E_P = K \cdot R_P \quad (4)$$

Symbol K represents a value specific to the apparatus measuring the said energy $E_P$. In the aforementioned film thickness measuring method, energy values of the reflected light of the reflectance-known sample P and the object sample S are measured by the same apparatus, and hence the following relation holds:

$$E_S = K \cdot R_S \quad (5)$$

The expression (3) is derived from the expressions (4) and (5).

On the basis of the absolute reflectance $R_S$ obtained at the step S20 and the correlation data stored in the memory 35, the thickness of the transparent thin film formed on the object sample S is obtained (step S21), and the thickness value is displayed on a display unit (not shown) (step S22).

An effect similar to that of the first embodiment can be obtained in the second embodiment, since the energy of reflected light is measured through the light of the ultraviolet region similarly to the first embodiment.

Although an exemplary method of obtaining film thickness through the relation holding between absolute reflectance and film thickness in relation to the second embodiment, the method of deriving the film thickness is not restricted to this. For example, the ratio of absolute reflectance $R_S$ obtained from reference etc. to absolute reflectance $R_P$ of a reflectance-known sample P may be operated every film thickness $d_x$ to store correlation between the film thickness $d_x$ and the ratio ($R_S/R_P$) in the memory 35 and to thereafter perform division $E_S/E_P$ with respect to energy $E_S$ of light reflected by an object sample S in the film thickness calculating unit 36 for retrieving the memory 35 with an address of the value $E_S/E_P$, to thereby regard film thickness stored with an address of $R_S/R_P$ being coincident with or approximate to $E_S/E_P$ as that of the transparent thin film.

In the aforementioned second embodiment, at a constant wavelength in the ultraviolet region, the correlation data of absolute reflectance and film thickness and energy of reflected light from the reflectance-known sample and the object sample S must be obtained. Although the wavelength may be arbitrarily set so far as the same is within the ultraviolet region, the same is preferably selected within a range of 180 to 240 nm.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for measuring an object thickness of a transparent thin film provided on a substrate of an object sample to be measured, said apparatus comprising:
   a light source for emitting ultraviolet light;
   illumination means for illuminating said transparent thin film of said object sample by using said ultraviolet light, said illumination means comprising an optical system;
   measuring means for measuring an energy of ultraviolet light reflected by said transparent thin film of said object sample;
   memory means for storing correlation data showing a correlation between energy of ultraviolet light reflected by a reference transparent thin film and thickness thereof;
   calculating means for calculating an object thickness of said transparent thin film on the basis of said measured energy and said correlation data; and
   monitor means for monitoring a film surface of said transparent thin film, thereby focusing said optical system and confirming a measuring position thereof with respect to the transparent thin film,
   wherein said monitor means comprises a visible light source for emitting visible light, shutter mirror means for selectively transmitting either said visible light or said ultraviolet light to said illumination means for illumination of said transparent thin film thereby, and image forming means for forming an image of said film surface on the basis of said visible light reflected by said transparent thin film and for displaying said image,
   said monitoring means further comprises a reflecting mirror for transmitting said visible light reflected by said transparent thin film to said image forming means, and
   said reflecting mirror has a pinhole for transmitting said ultraviolet light reflected by said transparent thin film to said measuring means.

2. An apparatus in accordance with claim 1, wherein:
   said light source emits multi-wavelength light of ultraviolet region, and
   said measuring means comprises spectroscopic means for separating said ultraviolet light reflected by said transparent thin film into spectral components, and an optical detector means for detecting said spectral components.

3. An apparatus in accordance with claim 2, wherein: said light source comprises a deuterium lamp.

* * * * *